United States Patent [19]

Komanduri et al.

[11] Patent Number: 4,671,147
[45] Date of Patent: Jun. 9, 1987

[54] INSTRUMENTED TOOL HOLDER

[75] Inventors: Ranga Komanduri; William R. Reed, Jr., both of Schenectady, N.Y.

[73] Assignee: General Electric Company, Schenectady, N.Y.

[21] Appl. No.: 739,346

[22] Filed: May 30, 1985

[51] Int. Cl.⁴ .................. B23B 29/04; B23B 7/00
[52] U.S. Cl. ..................... 82/36 R; 82/2 B; 73/104; 310/338
[58] Field of Search ............... 82/2 B, 1 C, 36 R; 73/104, 768, DIG. 4; 310/338

[56] References Cited

U.S. PATENT DOCUMENTS

| 3,566,163 | 2/1971 | Fischer et al. | 310/338 |
| 3,596,506 | 8/1971 | Wilson | 73/104 |
| 3,614,488 | 10/1971 | Sonderegger et al. | 310/338 |
| 4,451,892 | 5/1984 | McMurtry | 82/2 B |

Primary Examiner—Leonidas Vlachos
Attorney, Agent, or Firm—Paul E. Rochford; James C. Davis, Jr.; Paul R. Webb, II

[57] ABSTRACT

An instrumented tool holder is described wherein a multicomponent force sensor embedded in said tool holder beneath the cutting insert is so oriented that the resultant of cutting forces applied to the cutting insert will pass through the approximate center of the force sensor during a machining operation.

7 Claims, 7 Drawing Figures

INSTRUMENTED TOOL HOLDER

BACKGROUND OF THE INVENTION

This invention relates to a tool holder having a built-in device for sensing, and thereby monitoring, the cutting forces applied to a cutting insert during a machining operation.

Considerable effort is currently underway to develop devices for monitoring the cutting process in order to successfully implement untended machining systems. Some of the parameters under consideration for sensing by such devices include forces, torque, deflection, temperature, vibration and power.

The device of this invention is directed to the instrumentation of a tool holder in order to sense the magnitude of the cutting force applied to a cutting insert during a machining operation and/or the values of the ratios between force components. Actually, the forces being monitored are the forces resulting from the response of the cutting tool insert to the cutting action.

Force sensors are generally termed "dynamometers". Dynamometers for such force sensing incorporate sensors on the tool holder and the tool holder is mounted in a housing. Wire strain gage dynamometers have been used in this manner, but these are not very sensitive due to low gage factor (i.e. ability to convert strain signal into voltage signal) of about 2. Consequently, when wire strain gages have been used it has been necessary to use tool holders having a long overhang with the gage section (i.e. where the strain gages are mounted) having the smallest cross-section possible in a workable system. Such an arrangement has the inherent disadvantage of reducing the stiffness of the tool holder. Further, the response frequency of this type of dynamometer is also low. Semiconductor strain gage dynamometers are more sensitive (i.e. gage factor of approximately 120) but the response frequencies of these dynamometers are still low (i.e. a few hundred Hertz). Piezoelectric dynamometers (e.g. the Kistler piezoelectric 3-component lathe dynamometer Model 9263) have higher sensitivity as well as higher response frequency. However, the response frequency of commercial lathe dynamometers is still low since the sensing units are located in a housing, which imposes a heavy mass on top of the load cells. In addition to having low response frequency, the sensing system with its housing is bulky and inconvenient to mount on a machine tool turret.

In an attempt to improve force sensing capability, a paper presented by Lindstrom and Lindberg presented at the 24th International Machine Tool Design and Research Conference (Aug. 31 to Sept. 1, 1983) at Manchester, England describes a force monitoring arrangement in which a one-component force sensor using a piezoelectric element was mounted in the tool holder directly under the cutting tool insert. In this arrangement the normal component of the cutting force acted at one corner of the load cell. Such a force application to any load cell will result in the imposition of a bending moment to the load cell, a stress, which piezoelectric load cells are incapable of withstanding to any significant degree.

DESCRIPTION OF THE INVENTION

In contrast to the Lindstrom and Lindberg force monitoring arrangement, mounting of the load cell in the instant invention, rather than applying a bending moment thereto, subjects the load cell predominantly to compressive and shear forces, which stress applications piezoelectric crystals are adequately capable of withstanding.

This improvement is accomplished by embedding a multi-component force sensor (i.e. load cell) in the tool holder below the cutting insert with the force sensor so located that the resultant of cutting forces applied to the cutting insert during machining passes through the approximate center of the force sensor.

In the preferred arrangement a three-component, piezoelectric force sensor is employed. By having the resultant of the cutting forces pass through the center of the load cell, no bending stresses are imposed on the piezoelectric elements of the load cell. The direction of the resultant force is generally not constant, because it depends on tool geometry and cutting condition but use of a three-component dynamometer overcomes this drawback, because of the capability provided for recording not only the normal force, but also the other two components of force, when encountered (i.e., when the resultant force passes through the center of the load cell, but is not perpendicular to the plane of the load cell). In the recording and readout, the three-components of force which are actually measured are resolved subsequently into radial axial, and normal components of cutting force using a suitable cosine, sine, summing and square root amplifier system. Such amplifier systems and elements combinable into such a system are commercially available.

Location of the load cell in the tool holder is such that the mass of the tool holder between the load cell and the cutting tool insert is kept to a minimum.

When the load cell is located directly below the cutting insert (as in the Lindstrom et al. device) the load cell can be no larger than the insert (e.g. $\frac{1}{2}'' \times \frac{1}{2}''$ or $1'' \times 1''$). This limitation automatically limits the magnitude of the cutting force application that can be measured. The arrangement afforded by this invention, on the other hand, enables the use of load cells that are much larger than the cutting insert and are, therefore, able to measure much larger forces (e.g., a $\frac{1}{2}'' \times \frac{1}{2}''$ insert can be used with a $1'' \times 1''$ load cell). Also, there is no need for the shape of the insert to match the shape of the load cell so long as the alignment/orientation criteria are met [e.g. the cutting insert could be triangular or circular (viewed in plan) and the load cell could be square or rectangular (viewed in plan)].

BRIEF DESCRIPTION OF THE INVENTION

The features of this invention believed to be novel and unobvious over the prior art are set forth with particularity in the appended claims. The invention itself, however, as to the organization, method of operation and objects and advantages thereof, may best be understood by reference to the preceding and to the following description taken in conjunction with the accompanying drawings wherein:

MANNER AND PROCESS FOR MAKING AND USING THE INVENTION

Figure 1:
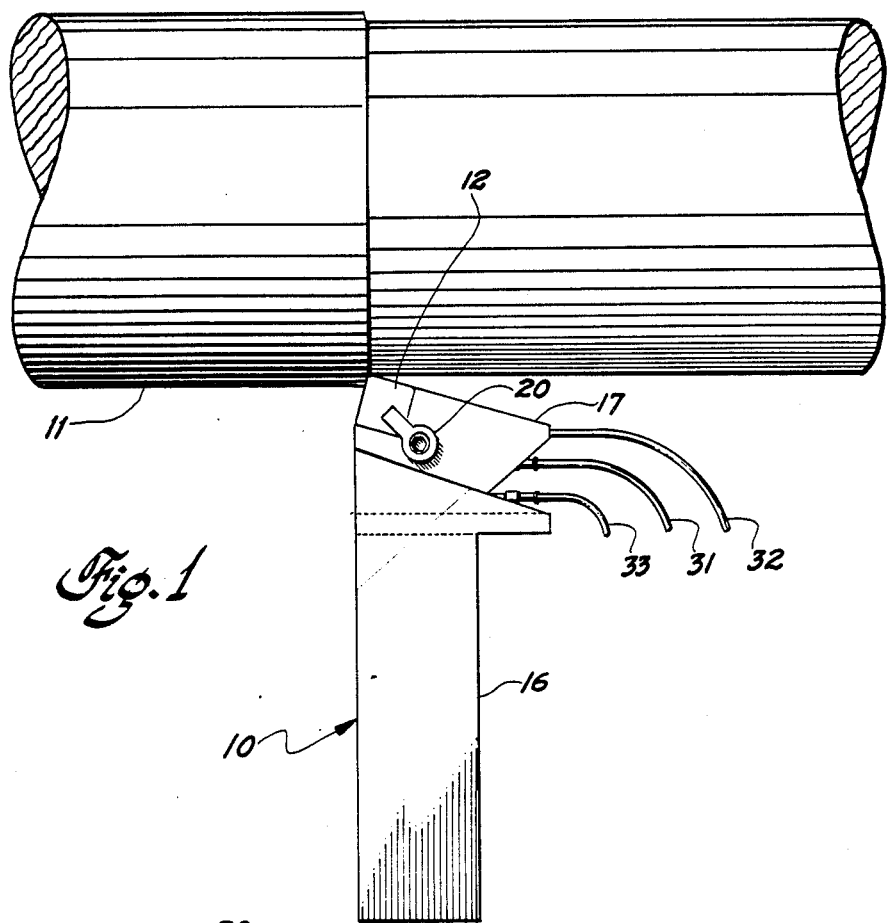
FIG. 1 is a schematic view showing the instrumented tool holder of this invention in plan in position for the machining of a rotating work piece.

Referring now to the drawings, in FIG. 1 instrumented tool holder 10 is shown adjacent work piece 11 mounted for rotation in a machining operation with the cutting insert 12 in cutting position against the work piece.

Figure 3:
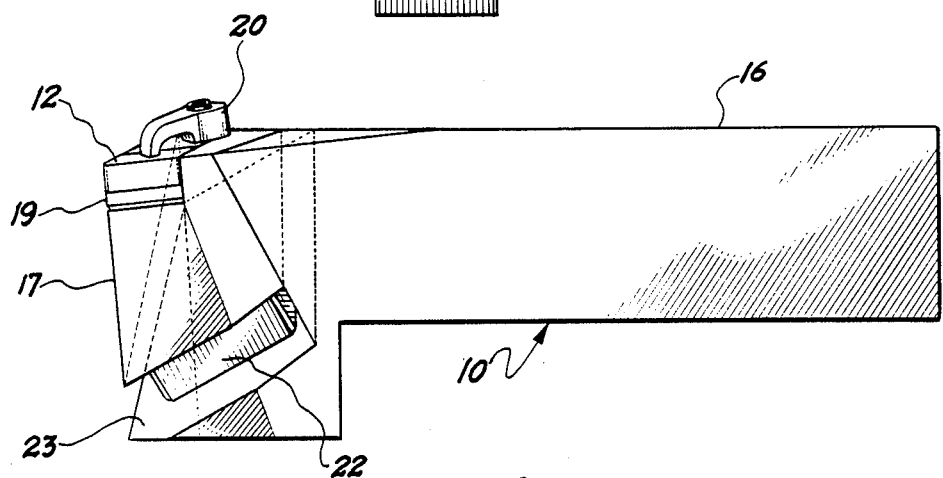
FIG. 3 is a schematic view of the side elevation of the instrumental tool holder of this invention.
Figure 2:
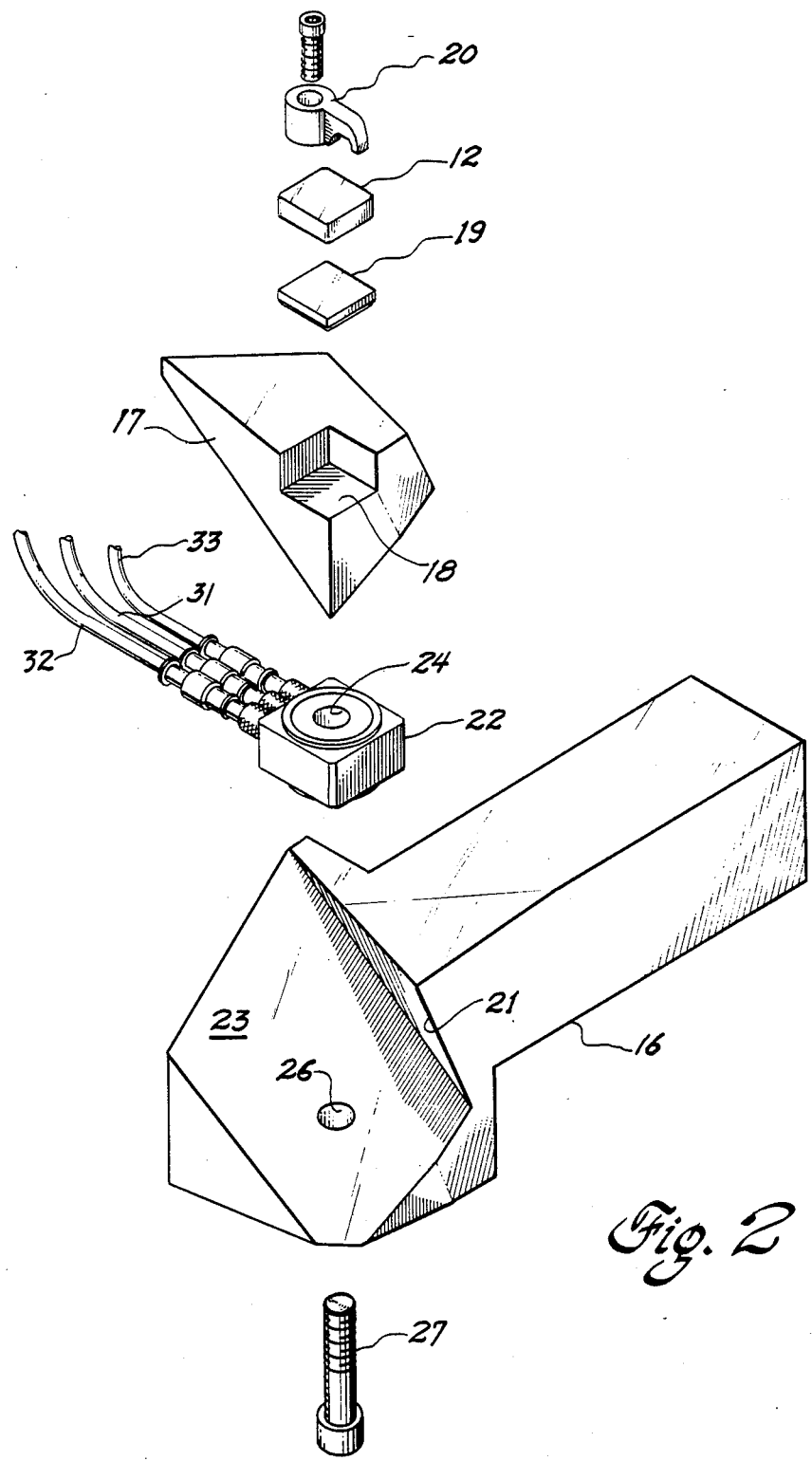
FIG. 2 is a schematic exploded view showing the component parts of the instrumented tool holder of this invention.
Figure 4:
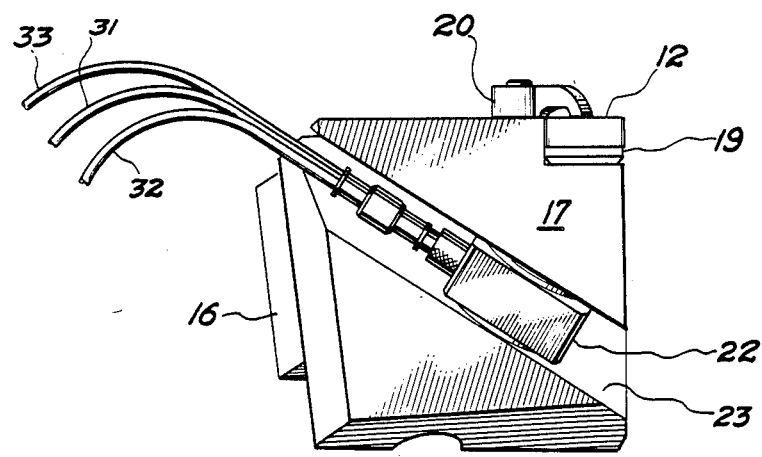
FIG. 4 is a schematic view in elevation of the front end of the instrumental tool holder of this invention.

Efforts toward factory automation have as part of their focus the successful implementation of untended machining systems. The development of simple, reliable sensing systems to monitor the cutting process are critical to the attainment of this goal. The monitoring of the force response of the cutting tool insert 12 to the cutting action is the objective of the instrumented tool holder 10 disclosed herein. The components of one embodiment of such a device are illustrated in the exploded view of instrumented tool holder 10 in FIG. 2 appearing as well in FIGS. 3, 4 and 5. As is shown therein, the structure comprises the main supporting base 16, tool insert support body 17 with tool insert-receiving recess 18 formed therein, tool insert 12 and support plate 19 therefor. Retainer 20 and its fastener holds the tool insert 12 and plate 19 in place.

Figure 5:
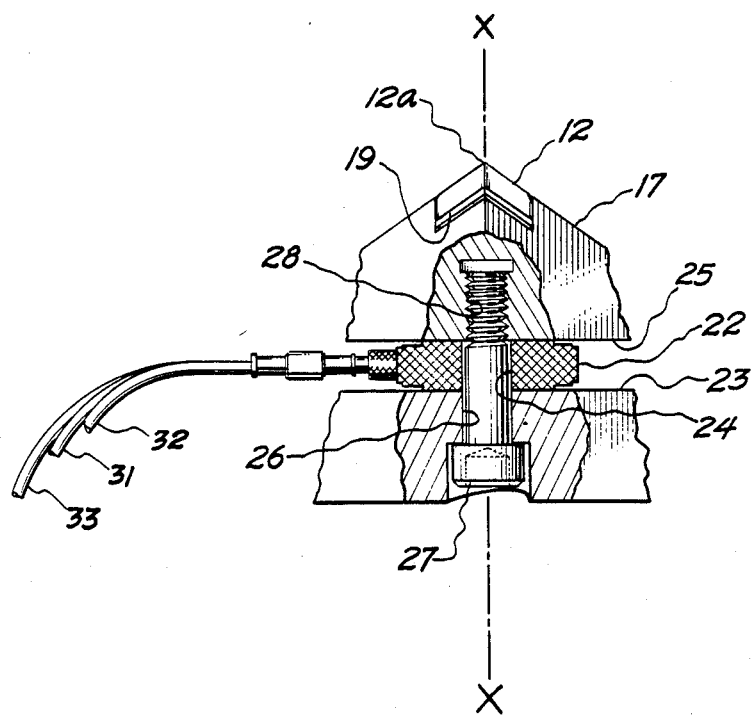
FIG. 5 is a schematic elevational view partially cut-away viewing the tool holder approximately mid-way between the views of FIGS. 3 and 4 to better illustrate the alignment/orientation required for the practice of this invention and FIGS. 6a and 6b show, respectively, the amplitude and phase responses of a dynamometer in the arrangement of the instant invention.

Cavity 21 formed in base 16 receives the threecomponent, piezoelectric force sensor 22 therein resting on sloping planar face 23 with hole 24 (through sensor 22) aligned with hole 26. Hole 26 extends through support 16 at an angle such that the center axis thereof is aligned to pass through the portion of tool insert 12 at which the cutting action occurs. In the assembled structure, body 17 is disposed in cavity 21 with its side faces close to, but out of contact with, the vertical surfaces thereof and having the underside thereof resting on the upper surface of sensor 22. Bolt 27 in the assembled position passes through hole 26 and hole 24 into threaded hole 28 in the underside of body 17. Although not so represented in the drawings, holes 24 and 26 are dimensioned to provide a close fit with the shank of bolt 27. As is shown in FIG. 5, in the preferred arrangement axis X—X coincides with the longitudinal central axis of bolt 27, passes through the center of force sensor 22 and outer tip 12a of insert 12 and is perpendicular to mutually parallel planar surfaces 23 and 25. In the usual cutting operation the resultant of the cutting forces will coincide with axis X—X during only part of the cutting sequence. Bolt 27 serves the dual purposes of fastening the parts 16, 17 and 22 together in the proper relationship and of applying a preload to sensor 22. Preloading is needed to enable the shear elements in the load cell to sense horizontal forces manifest as friction.

By locating the central axis of hole 26 (and face 23 perpendicular thereto) at the proper angle, sensor 22 is, in turn, oriented at such an angle that the resultant of the cutting forces passes approximately through the center (i.e. the center of hole 24) of load cell 22. Connecting leads 31, 32, 33 conduct electrical signals induced by compressive and shear forces applied to load cell 22. The direction of the resultant force is generally not constant and, therefore, in the non-ideal operating condition two shear components of the resultant force will be present and be sensed as developing electric signals conducted via all three of leads 31, 32, 33 to a conventional amplifier and recording system (not shown).

To the extent possible, load cell 22 is located so as to minimize the mass of body 17. Also, body 17 may be made of the same material as support base 16 (e.g. AISI 4340 steel) or, preferably, a material such as a titanium alloy, that is lighter (i.e. of lower density) but stronger than the material of which base 16 is made. By making body 17 of such a strong, less dense material to thereby reduce its mass, the natural frequency of the sensor is increased. The commercial unit employed in construction of the device of this invention was the Kistler quartz force transducer (model 9251) for sensing three components.

Figures 6A, 6B:
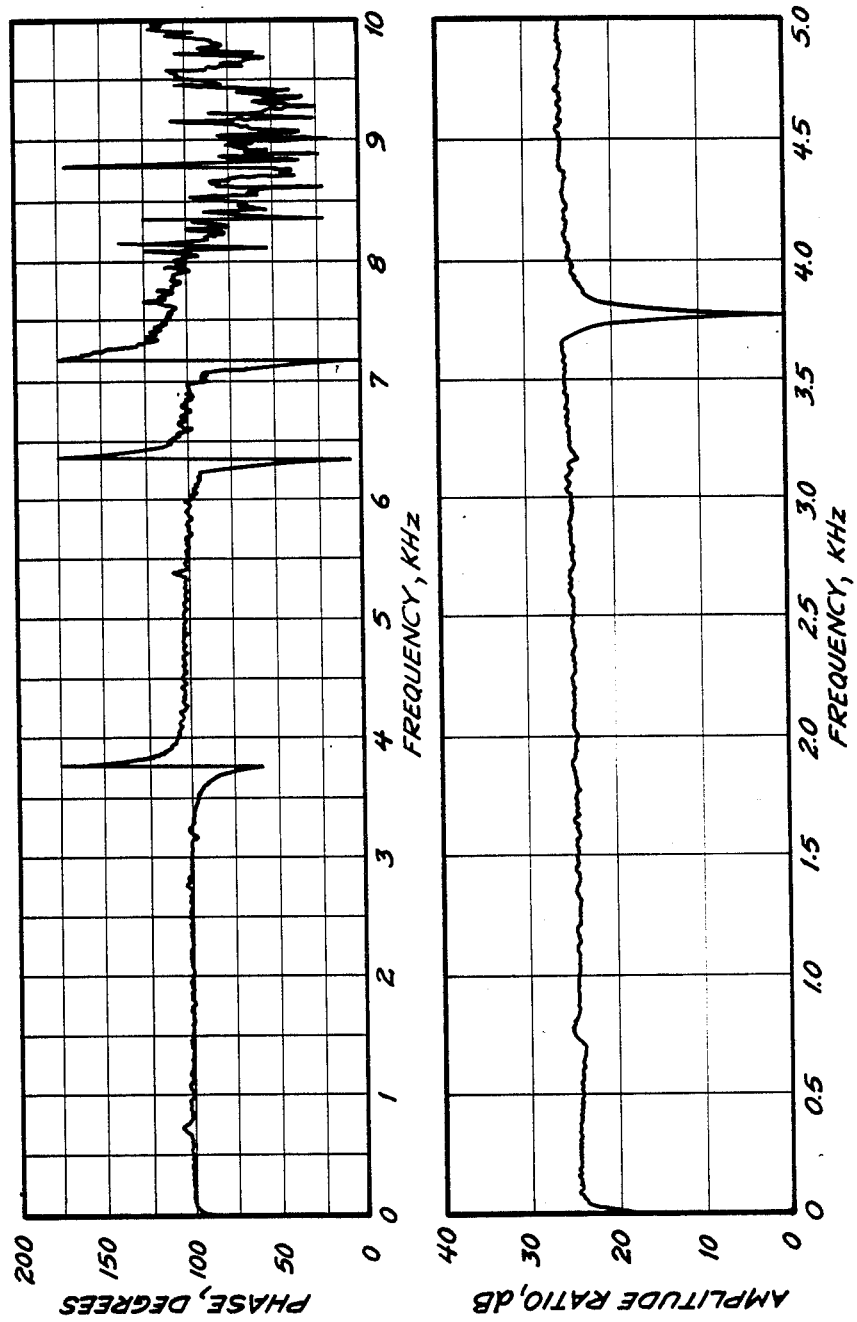

A determination was made of the frequency response of instrumental tool holder 10 in which the Kistler model 9251 transducer was used. The information generated (phase and amplitude ratio) as a function of frequency was obtained by impacting the tool tip (i.e. insert 12) with an instrumented hammer in the Z-direction (i.e., normal to the cutting edge) and measuring the force response in the same direction. This information is presented as FIG. 6a (phase vs. frequency) and FIG. 6b (amplitude ratio vs. frequency). The initial sharp deviations occurring in the graphs of these data show a correlation for both phase and frequency ratio at the value of 3.775 KHz, which is the first natural frequency of the system. This compares to a value for frequency response of about 600 Hz for a commercial dynamometer able to measure forces of the same magnitude.

What is claimed is:

1. A cutting mechanism for a machining operation provided with sensing means embedded therein as part of a system for monitoring, during a machining operation, the cutting force applied to a cutting insert supported by said mechanism which comprises, a cutting tool holder,
said cutting tool holder having a cutting insert disposed at one edge portion thereof
a multi-component force sensor embedded in said tool holder below said cutting insert,
said cutting tool holder being composed of a plurality of parts,
a first and second of said plurality of parts having juxtaposed parallel planar faces,
said force sensor having opposite surfaces in abutment with said planar faces,
said faces being disposed generally perpendicular to a line passing through the center of the force sensor and through the outer tip of the cutting insert,
said force sensor being thereby located and oriented so that the resultant of cutting force applied to said cutting insert will pass through the approximate center of said force sensor during the machining operation.

2. The mechanism as recited in claim 1 wherein the force sensor is a piezoelectric force transducer.

3. The mechanism as recited in claim 1 further including means for preloading the force sensor.

4. The mechanism as recited in claim 1 wherein means are provided to sense the force component normal to the force sensor plus two shear components of the resultant force, when present.

5. The mechanism as recited in claim 1 wherein the force sensor is significantly larger in at least one dimension than any dimension of the cutting insert.

6. The mechanism as recited in claim 1 wherein the shape of the force sensor viewed in plan is significantly different from the shape of the cutting insert viewed in plan.

7. The mechanism as recited in claim 1 wherein the mass of the first part is reduced to the minimum required for structural support of the cutting insert and assembly of the first and second parts.

* * * * *